United States Patent
Brouwer

(10) Patent No.: US 6,915,897 B2
(45) Date of Patent: Jul. 12, 2005

(54) TRAILER LOADER/UNLOADER WITH PULLOUT SECTION

(75) Inventor: Gerald A. Brouwer, Grandville, MI (US)

(73) Assignee: Rapistan Systems Advertising Corp., Grand Rapids, MI (US)

(*) Notice: Subject to any disclaimer, the term of this patent is extended or adjusted under 35 U.S.C. 154(b) by 0 days.

(21) Appl. No.: 10/709,669

(22) Filed: May 21, 2004

(65) Prior Publication Data

US 2004/0231953 A1 Nov. 25, 2004

Related U.S. Application Data

(60) Provisional application No. 60/320,211, filed on May 22, 2003.

(51) Int. Cl.[7] .............................................. B65G 15/60
(52) U.S. Cl. .................... 198/812; 193/35 TE; 198/594
(58) Field of Search .................... 193/35 TE; 198/588, 198/594, 595, 812

(56) References Cited

U.S. PATENT DOCUMENTS

| | | | | |
|---|---|---|---|---|
| 2,350,449 A | * | 6/1944 | Couch ........................ 414/680 |
| 2,768,732 A | * | 10/1956 | Muhlenbruch .............. 198/812 |
| 2,793,736 A | * | 5/1957 | Thomson ..................... 198/782 |
| 2,815,849 A | * | 12/1957 | Zumbrunnen ............... 198/812 |
| 4,425,069 A | * | 1/1984 | Saur et al. ................... 414/398 |
| 5,224,584 A | * | 7/1993 | Best et al. ................... 198/782 |
| 5,351,809 A | * | 10/1994 | Gilmore et al. ............. 198/812 |
| 5,423,413 A | * | 6/1995 | Gilmore ...................... 198/594 |
| 5,429,225 A | * | 7/1995 | Schiesser et al. ....... 198/781.06 |
| 5,487,462 A | * | 1/1996 | Gilmore ...................... 198/594 |
| 6,006,893 A | * | 12/1999 | Gilmore et al. ............. 198/588 |
| 6,484,862 B1 | * | 11/2002 | Gilmore et al. ......... 193/35 TE |
| 6,533,096 B2 | * | 3/2003 | Gilmore et al. ......... 193/35 TE |

* cited by examiner

*Primary Examiner*—Richard Ridley
(74) *Attorney, Agent, or Firm*—Van Dyke, Gardner, Linn & Burkhart, LLP

(57) ABSTRACT

An extendable conveying system for either loading product to or unloading product from a trailer includes an extendable section which defines a conveying surface. The system further includes a pullout section that defines a support surface. The pullout section has an extended position and a retracted position. When the pull-out section is in its extended position, its support surface at least partially extends from the conveying surface. The system further includes an energy-storing device connected with the pullout section and the extendable section. The energy-storing device stores energy as the pullout section is moved from either the extended or retracted position to the other of the extended or retracted positions. The energy storing device then delivers energy to the pull-out section as the pull-out section is moved from the other of the extended or retracted positions to the initial of the extended or retracted positions.

13 Claims, 4 Drawing Sheets

TRAILER LOADER/UNLOADER WITH PULLOUT SECTION

CROSS REFERENCE TO RELATED APPLICATIONS

This application claims priority from U.S. provisional patent application Ser. No. 60/320,211, filed on May 22, 2003, the disclosure of which is hereby incorporated herein by reference in its entirety.

BACKGROUND OF INVENTION

The present invention pertains to trailer loaders and/or unloaders and, in particular, to an extendable conveying system having a pullout section.

Extendable conveying systems are useful in assisting an operator to load and/or unload a trailer. They deliver the goods to, or remove the goods from, the location of the operator, thereby minimizing the amount of movement of the operator. Certain designs of a trailer loader/unloader utilize a pullout section. Such pullout section may provide an additional extension to the conveying system that is manually extended or retracted by the operator. The pull-out section may be pitched at an angle and may be of significant length, such as 12 feet, thereby requiring significant force to retract the pullout section into the remaining portion of the system. Because the pullout section may be close to the floor of the trailer, the operator may be forced to stoop over while attempting to apply sufficient force to retract the pullout section thereby further decreasing ergonomic efficiency.

SUMMARY OF INVENTION

The present invention is directed to an extendable conveying system for either loading product to or unloading product from a trailer. The system includes an extendable section which defines a conveying surface. The system further includes a pullout section that defines a support surface. The pullout section has an extended position and a retracted position. When the pullout section is in its extended position, its support surface at least partially extends from the conveying surface. The system further includes an energy-storing device connected with the pull-out section and the extendable section. The energy-storing device stores energy as the pullout section is moved from either the extended or retracted position to the other of the extended or retracted positions. The energy storing device then delivers energy to the pull-out section as the pull-out section is moved from the other of the extended or retracted positions to the initial of the extended or retracted positions.

These and other objects, advantages and features of this invention will become apparent upon review of the following specification in conjunction with the drawings.

DETAILED DESCRIPTION OF THE PREFERRED EMBODIMENT

Figure 1:
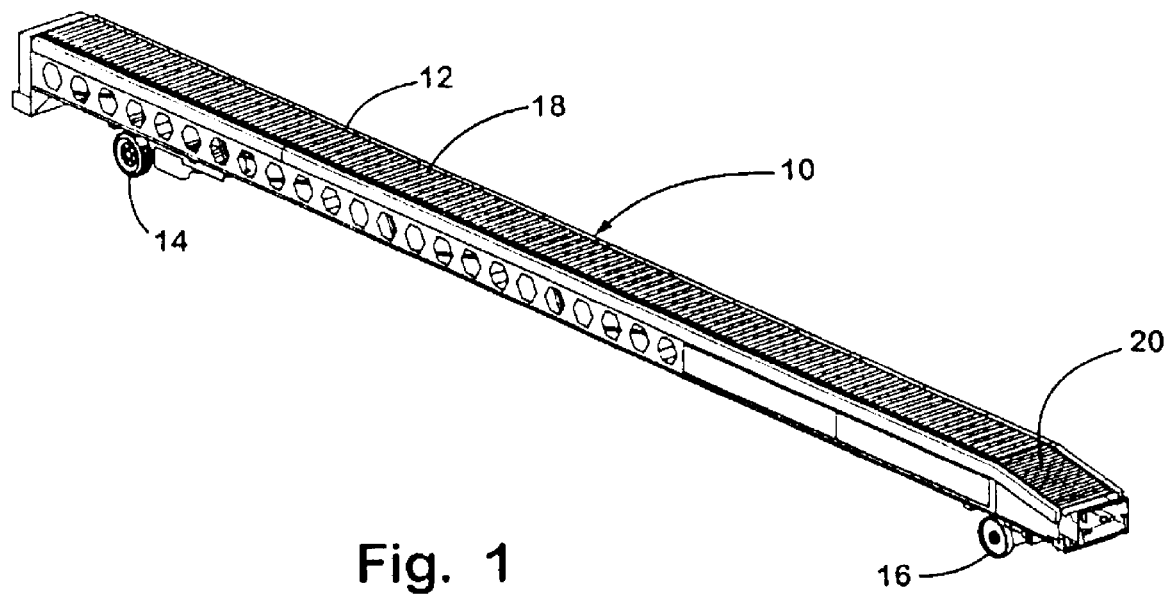
FIG. 1 is a perspective view of an extendable conveying system, according to the invention.

Referring now specifically to the drawings, and the illustrative embodiments depicted therein, an extendable conveyor system 10 includes an extendable section 12 which may be extended into a semi-trailer, or the like, such as by operation of motor driven wheels 14 and steerable wheels 16. Such an extendable conveying system is generally known in the art and is described in detail in commonly assigned U.S. Pat. No. 4,425,069, the disclosure of which is hereby incorporated herein by reference. Extendable section 12 includes a conveying surface 18 which is capable of conveying product. In the illustrative embodiment, extendable conveying system 10 is illustrated as a trailer loader wherein product is conveyed in a general left-to-right direction, as viewed in FIG. 1. Conveying surface 18, in the illustrative embodiment, is a driven conveying surface having accumulation capabilities generally of the type disclosed in commonly assigned U.S. Pat. No. 5,429,225, the disclosure of which is hereby incorporated herein by reference. It should be understood that conveying surface 18 may be a gravity-conveying surface which is not driven but, rather, product is propelled by the force of gravity. Alternatively, conveying surface 18 may be driven in an opposite direction, namely from right-to-left, as viewed in FIG. 1, whereby the extendable conveying system may be a trailer unloader. Also, although extendable section 12 is illustrated as supportable from a trailer floor by virtue of wheels 14, 16, the extendable conveyor system may be a cantilevered-supported nesting-type of extendable conveyor, such as disclosed in commonly assigned U.S. Pat. Nos. 5,351,809; 5,423,413; 5,487,462; 6,006,893; and 6,484,862, the disclosures of which are hereby incorporated herein by reference in their entirety.

Figure 2:
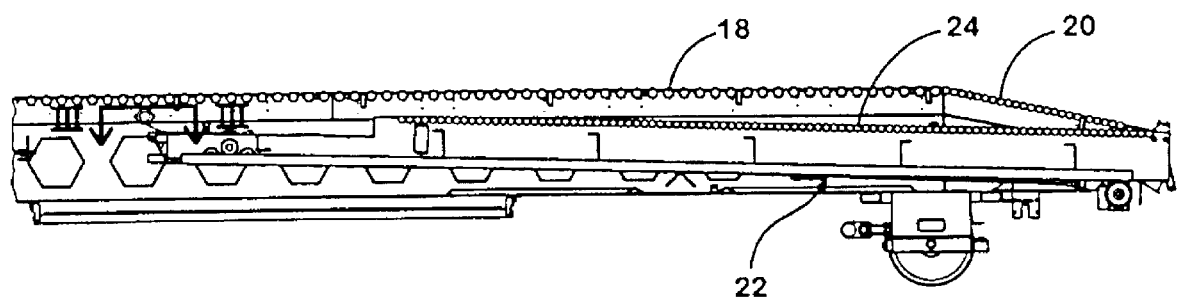
FIG. 2 is a side elevation of a portion of the extendable conveying system in FIG. 1.

In the illustrative embodiment, conveying surface 18 includes a terminal portion 20 which, in the illustrative embodiment, is a gravity-conveying surface but may be other types of conveying surfaces. Extendable conveying system 10 includes a pull-out section 22 which has a retracted position in which it is nested within extendable section 12, as illustrated in FIG. 2. Pullout section 22 includes a support surface, such as a conveying surface 24 which extends from conveying surface 18 when pullout section 22 is extended. In the illustrated embodiment, support surface 24 is illustrated as a gravity-conveying surface but may also be a non-conveying surface which merely supports product discharged from conveying surface 18. As supporting a gravity-conveying surface in the illustrative embodiment, pullout section 22 is pitched at an angle from horizontal, as illustrated in FIG. 2. Thus, as pullout section 22 is extended, it does so with the assistance of gravity. As pullout section 22 is retracted to the position illustrated in FIG. 2, the operator must do so against the force of gravity. This significantly adds to the effort required to retract the pullout section.

Figure 3:
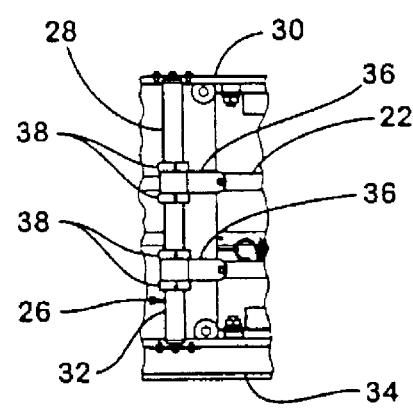
FIG. 3 is a sectional view taken along the lines III—III in FIG. 2.
Figure 4:
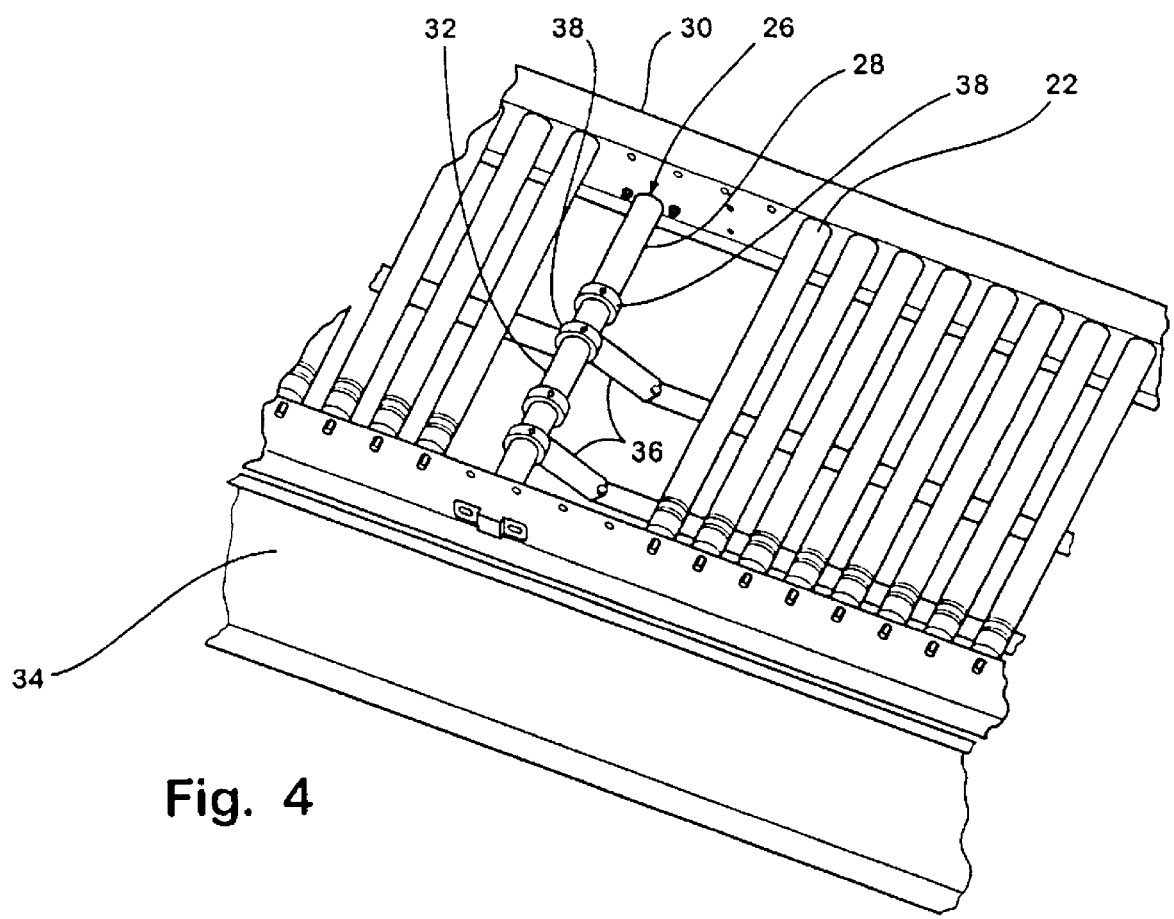
FIG. 4 is a perspective view illustrating the matter in FIG. 3 within the extendable conveying system.
Figure 5:
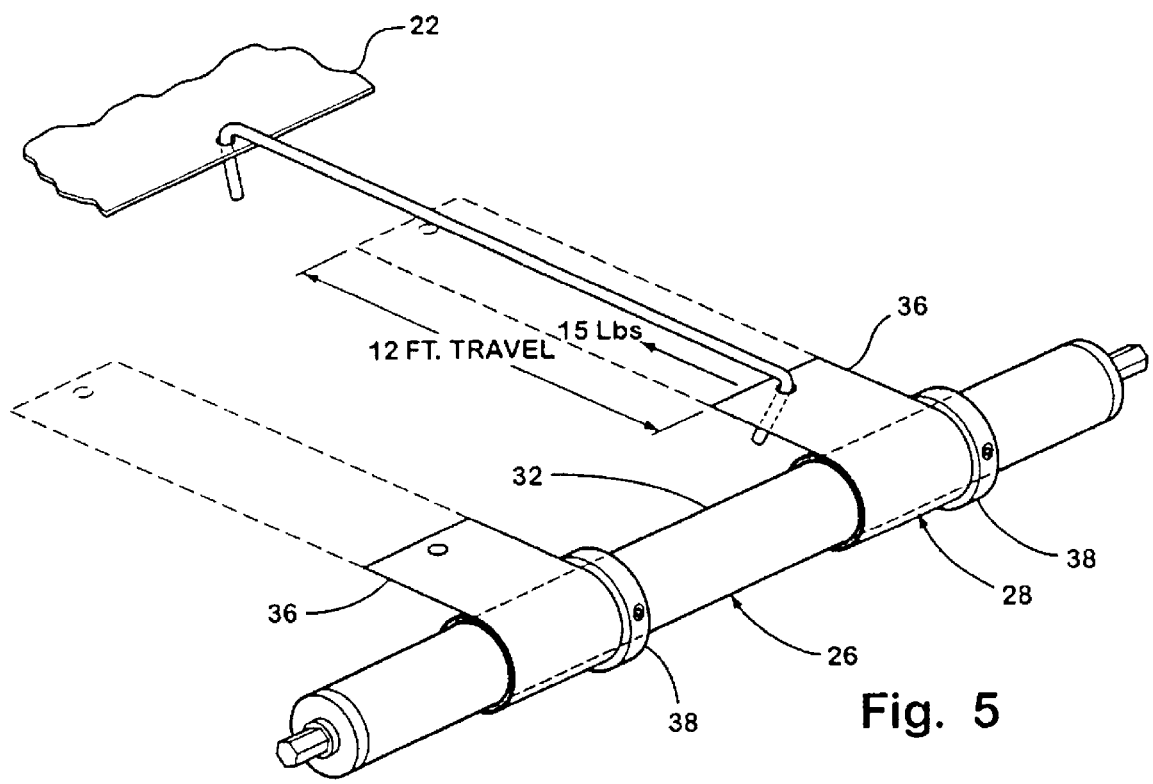
FIG. 5 is a perspective view similar to that of FIG. 4 illustrating operation thereof.

In order to overcome such deficiencies, an energy-storing device 26 is provided (FIGS. 3–5). Energy-storing device 26 stores energy as pullout section 22 moves from the retracted position illustrated in FIG. 2 to an extended position. This is accomplished in the illustrative embodiment by a spring 28 which has a constant force throughout its length of travel as the pullout section is extended. In the illustrative embodiment, that constant force is applied throughout 12 feet of travel. However, it should be understood that the length of travel may vary depending upon the application. Such a constant force may be obtained by a clock spring device, which is also known in the art as a negator spring. Such devices are commercially available. The spring is fixedly attached to a side channel 30 of extendable section 12 and receives therein a roller 32 which extends to an opposite side channel 34. A pair of straps 36 are interconnected with a portion of pullout section 22. Straps 36 wrap around shaft 32 and are held in place by collars 38.

In operation, as pullout section 22 is extended, straps 36 unwind from roller 32. In the process, spring 28 is wound thereby storing energy. As the pullout section is retracted to the position illustrated in FIG. 2, the energy stored in the spring is released thereby assisting the operator in retracting he pullout section against the force of gravity and/or friction. In the illustrative embodiment, a total of 30 pounds of spring force are utilized. However, this amount is dependent upon the application. Also, although the invention is illustrated with a clock spring, other types of springs may be utilized, such as various forms of torsion springs, expansion springs, compression springs, and the like. Also, various forms of weight systems may be utilized. Suitable interconnections adapt the invention to those different embodiments.

Changes and modifications in the specifically described embodiments can be carried out without departing from the principles of the invention which is intended to be limited only by the scope of the appended claims, as interpreted according to the principles of patent law including the doctrine of equivalents.

What is claimed is:

1. An extendable conveying system for loading product to or unloading product from a trailer, comprising:

an extendable section;

a conveying surface defined by said extendable section;

a pullout section that defines a support surface, said pullout section having an extended position and a retracted position, said support surface at least partially extended from said conveying surface when said pullout section is in said extended position; and an energy-storing device connected with said pullout section and said extendable section, said energy-storing device storing energy as said pullout section is moving from one of said extended and retracted positions to the other of said extended and retracted positions, said energy-storing device delivering energy to said pullout section as said pullout section is moving from said other of said extended and retracted positions to said one of said extended and retracted positions;

wherein said energy-storing device comprises a spring assembly.

2. The system of claim 1 wherein said support surface comprises at least one selected from another conveying surface and a non-conveying surface.

3. The system of claim 1 wherein said support surface comprises a gravity roller-conveying surface.

4. The system of claim 1 wherein said conveying surface comprises an accumulation conveyor.

5. The system of claim 1 wherein said spring assembly comprises a constant force spring assembly.

6. The system of claim 1 wherein said spring assembly comprises a negator spring assembly.

7. The system of claim 1 wherein said spring assembly comprises a torsion spring.

8. The system of claim 1 wherein said spring assembly comprises an expansion spring.

9. The system of claim 1 wherein said spring assembly comprises a compression spring.

10. An extendable conveying system for loading product to or unloading product from a trailer, comprising:

an extendable section;

a conveying surface defined by said extendable section;

a pullout section that defines a support surface, said pullout section having an extended position and a retracted position, said support surface at least partially extended from said conveying surface when said pullout section is in said extended position; and an energy-storing device connected with said pullout section and said extendable section, said energy-storing device storing energy as said pullout section is moving from one of said extended and retracted positions to the other of said extended and retracted positions, said energy-storing device delivering energy to said pullout section as said pullout section is moving from said other of said extended and retracted positions to said one of said extended and retracted positions;

said energy-storing device comprising a weight system.

11. The system of claim 10 wherein said support surface comprises at least one selected from another conveying surface and a non-conveying surface.

12. The system of claim 10 wherein said support surface comprises a gravity roller-conveying surface.

13. The system of claim 10 wherein said conveying surface comprises an accumulation conveyor.

* * * * *